(12) United States Patent
Hsu et al.

(10) Patent No.: US 7,763,842 B2
(45) Date of Patent: Jul. 27, 2010

(54) MOTION DETERMINATION APPARATUS AND METHOD THEREOF

(75) Inventors: Chih-Feng Hsu, Taoyuan (TW); Yih-Feng Kao, Taoyuan (JP); Kuo-Chen Wu, Taoyuan (TW); Ming-San Huang, Taoyuan (TW); John C. Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 880 days.

(21) Appl. No.: 11/617,120

(22) Filed: Dec. 28, 2006

(65) Prior Publication Data

US 2007/0234779 A1 Oct. 11, 2007

(30) Foreign Application Priority Data

Dec. 30, 2005 (TW) .............................. 94147792 A

(51) Int. Cl.
G05B 11/06 (2006.01)

(52) U.S. Cl. ..................... 250/221; 250/559.32; 700/17; 700/83; 345/156

(58) Field of Classification Search .................. 250/221, 250/559.29, 559.32, 559.39; 700/17, 28, 700/30, 31, 71, 83; 345/156–158, 163; 715/700, 715/863
See application file for complete search history.

(56) References Cited

U.S. PATENT DOCUMENTS

| | | |
|---|---|---|
| 2003/0038778 A1 | 2/2003 | Noguera |
| 2003/0065409 A1 | 4/2003 | Raeth et al. |
| 2004/0130524 A1 | 7/2004 | Matsui |
| 2005/0076161 A1 | 4/2005 | Albanna et al. |
| 2009/0219401 A1* | 9/2009 | Drouot ..................... 348/208.4 |

FOREIGN PATENT DOCUMENTS

WO 2005109847 A2 11/2005

\* cited by examiner

*Primary Examiner*—Kevin Pyo

(57) ABSTRACT

The motion determination apparatus includes a motion sensor for sensing motion of an electronic device and sending out a motion parameter. A processor receives the motion parameter to determine whether or not his motion is a meaningful motion. A device controller activates a device function according to the determination.

21 Claims, 3 Drawing Sheets

MOTION DETERMINATION APPARATUS AND METHOD THEREOF

RELATED APPLICATIONS

The present application is based on, and claims priority from, Taiwan Application Serial Number 94147792, filed Dec. 30, 2005, the disclosure of which is hereby incorporated by reference herein in its entirety.

FIELD OF THE INVENTION

The present invention relates to a determination apparatus and method thereof and more particularly to a motion determination apparatus and method thereof for filtering out accidental movements of a portable device.

BACKGROUND OF THE INVENTION

It is a current trend to assemble a motion sensor in a portable electronic device to calculate and ascertain movement in three dimensional (3D) spaces and based on the movement to control the portable electronic device to perform corresponding commands.

However, many existing motion sensor algorithms misread accidental motions as deliberate tilts. Furthermore, power supply noise and electromagnetic interference can also impact acceleration values. For motion sensor to accurately decipher intentional movement within electronic devices, algorithm programs need to be properly calibrated to accurately filter out accidental movements and other forms of interference.

Therefore, an apparatus and method that may filter out the accidental motions is required.

SUMMARY OF THE INVENTION

Therefore, it is the main object of the present invention to provide an apparatus to determine whether the motion of an electronic device is an intentional movement or not.

Another purpose of the present invention is to provide an apparatus to determine whether the motion of an electronic device may trigger the corresponding function or not.

A further purpose of the present invention is to provide a method to determine whether the motion of an electronic device may trigger the corresponding function.

According to the present invention, a motion detection apparatus is installed in an electronic device, the apparatus comprises: a motion sensor to detect motion of the electronic device and generate a plurality of motion parameter values; a processor for receiving the motion parameter values to generate a first curve and a second curve, wherein the first curve is formed by connecting a plurality of average values that are generated by averaging a first number of the motion parameter values, and the second curve is formed by connecting a plurality of average values that are generated by averaging a second number of the motion parameter values, and based on a relationship between the first curve and the second curve to send out a control instruction; and a controller for receiving the instruction to perform the corresponding function.

According to another embodiment, the apparatus further comprises a user interface to change the first number and the second number.

According to another embodiment, a method for determining the motion of an electronic device is disclosed. The method comprises the steps of (a) detecting the electronic device to send a plurality of motion parameter values sequentially; (b) generating a first curve, wherein the first curve is formed by connecting a plurality of average values that are generated by averaging the motion parameter values of a first number of detected points detected before each detected point; (c) generating a second curve, wherein the second curve is formed by connecting a plurality of average values that are generated by averaging the motion parameter values of a second number of detected points detected before each detected point; (d) calculating the separated distance between the first curve and the second curve; (e) comparing the separated distance with a threshold value; and (f) triggering a corresponding function when the separated distance is larger than the threshold value.

According to another embodiment, the step (f) further comprises performing step (a) when the separation distance is equal to zero.

According to another embodiment, the step (e) further comprises performing step (a) when the separated distance is less than the threshold value.

According to another embodiment, the method further comprises changing the first number and the second number.

According to the present invention, a determination process is installed in the processor to filter the motion of the portable electronic device that the motion parameter value is less than the threshold value. Therefore, the apparatus and the method may avoid a function being triggered by the meaningless motion.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein.

DETAILED DESCRIPTION OF THE PREFERRED EMBODIMENT

When a user holds a portable electronic device, accidental movement may occur due to the inherent unstable nature of the user's hand. This kind of accidental movement is not an intentional movement. In other words, no corresponding function should be triggered by the accidental movement of the portable electronic device. Therefore, in this present invention, a determination step is added before triggering a function of the portable device to filter out accidental movements.

Figure 1:
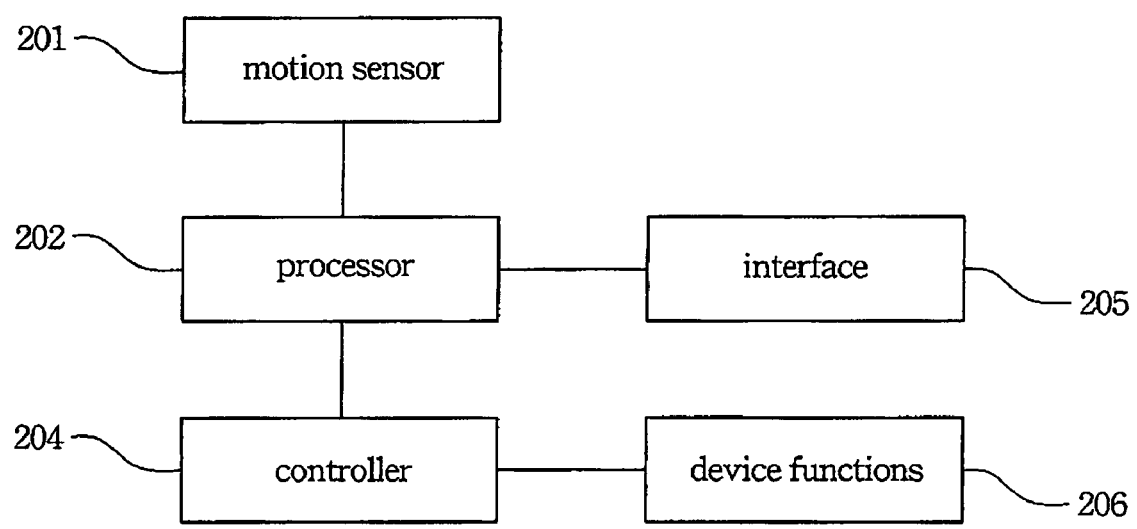
FIG. 1 illustrates a schematic diagram of a motion determination apparatus according to a preferred embodiment.

FIG. 1 illustrates a schematic diagram of a motion determination apparatus according to a preferred embodiment. The motion determination apparatus 200 is embedded in a portable electronic device, such as a mobile phone, a personal digital assistants (PDA), a notebook and so on.

The motion determination apparatus 200 of the present invention includes a motion sensor 201, a processor 202 and a controller 204. The motion sensor 201 is, for example, a 2-axle accelerator, a 3-axle accelerator, an inclinometer or a compass sensor. The motion sensor 201 senses the motion of the portable electronic device and sends out a motion parameter. The motion parameter is a sine value of a tilt angle of the portable electronic device. The processor 202 is coupled with the motion sensor 201. A determination process is installed in the processor 202 to determine the motion parameter whether or not represents an intentional movement motion. The controller 204 may trigger corresponding device functions 206 based on the results of the determination. It is noticed that many threshold values are set in the present invention to separate different functions. In another embodiment, the motion determination apparatus 200 further includes a user interface 205 coupled with the processor 202. The user may adjust the threshold values through the user interface 205.

Figure 2:
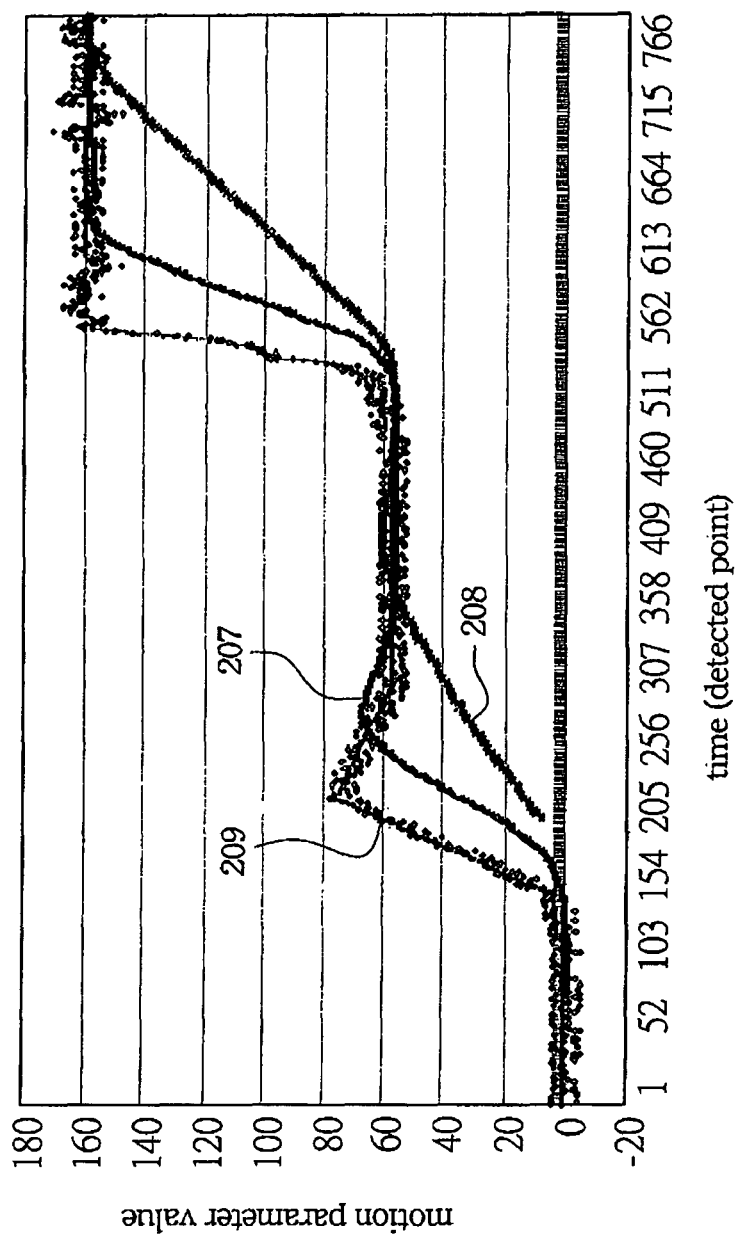
FIG. 2 illustrates a comparison diagram to determine whether or not the motion is an intentional movement motion.

FIG. 2 illustrates a comparison diagram to determine whether or not the motion is an intentional movement. The horizontal axis shows the detection time of the portable electronic device detected by the motion sensor 201. For example, the portable electronic device is detected once by the motion sensor 201 every 1 ms. It is noticed that a user may set the periodicity to detect the motion through the interface 205. The vertical axis is the motion parameter. In this embodiment, the motion parameter on the y-axis is the sine value of the tilt angle of the portable electronic device. In this figure, the sine value is enlarged by 1000 times. For example, a point shown in this figure has a motion parameter of 173, which means the real sine value is 0.173, which implies the electronic device is tilted by about 10 degrees.

In the FIG. 2, average motion parameter value curves 207 and 208 are compared with the motion parameter value curve 209 to determine whether or not the motion is an intentional movement. Please refer to FIG. 1 and FIG. 2, each point in the curve 209 represents a motion parameter value of one detected point. Each point in the curve 207 represents an average motion parameter value over the previous 80 detected points. For example, the motion parameter of the $300^{th}$ detected point in the curve 207 is the mean of the motion parameters of the $220^{th}$ to the $300^{th}$ detected points in the curve 209. Each point in the curve 208 represents an average motion parameter value over the previous 210 points. For example, the motion parameter of the $300^{th}$ detected point in the curve 208 is the mean of the motion parameters of the $90^{th}$ to the $300^{th}$ detected points in the curve 209. It is noticed that a user may set the number of the points to average through the interface 205. According to an embodiment, the ratio of the number of observation points of the curve 207 to the number of observation points of the curve 208 is between 1.2 to 5, and preferably is between 1.5 to 2.7. When the portable electronic device doesn't move, the means of motion parameter values of the two curves 207 and 208 are same. Therefore, the two curves 207 and 208 may overlap together.

Each point in the curve 207 is the mean over the previous 80 detected points. Each point in the curve 208 is the mean over the previous 210 detected points. Because of a lager number of averaging points, the curve 208 is smoother and less sensitive than curve 207. By analyzing and contrasting the data from the curves 207 and 208, it accurately determines whether the movement values represent intentional gestures or unintentional movements/interference. If the curves 207 and 208 are intersected or overlapped, the movement is unintentional or is power supply noise/electromagnetic interference, and such movement shall be ignored or filtered. On the other hand, a noticeable gap or significant separation between the curves 207 and 208, as illustrated in the FIG. 2, is usually indicative of intentional movement. A threshold value can be predefined to evaluate whether the gap of separation between the two curves is significant enough to constitute an "intentional movement". Therefore, the controller 204 may trigger a corresponding function 206 based on the motion.

Figure 3:
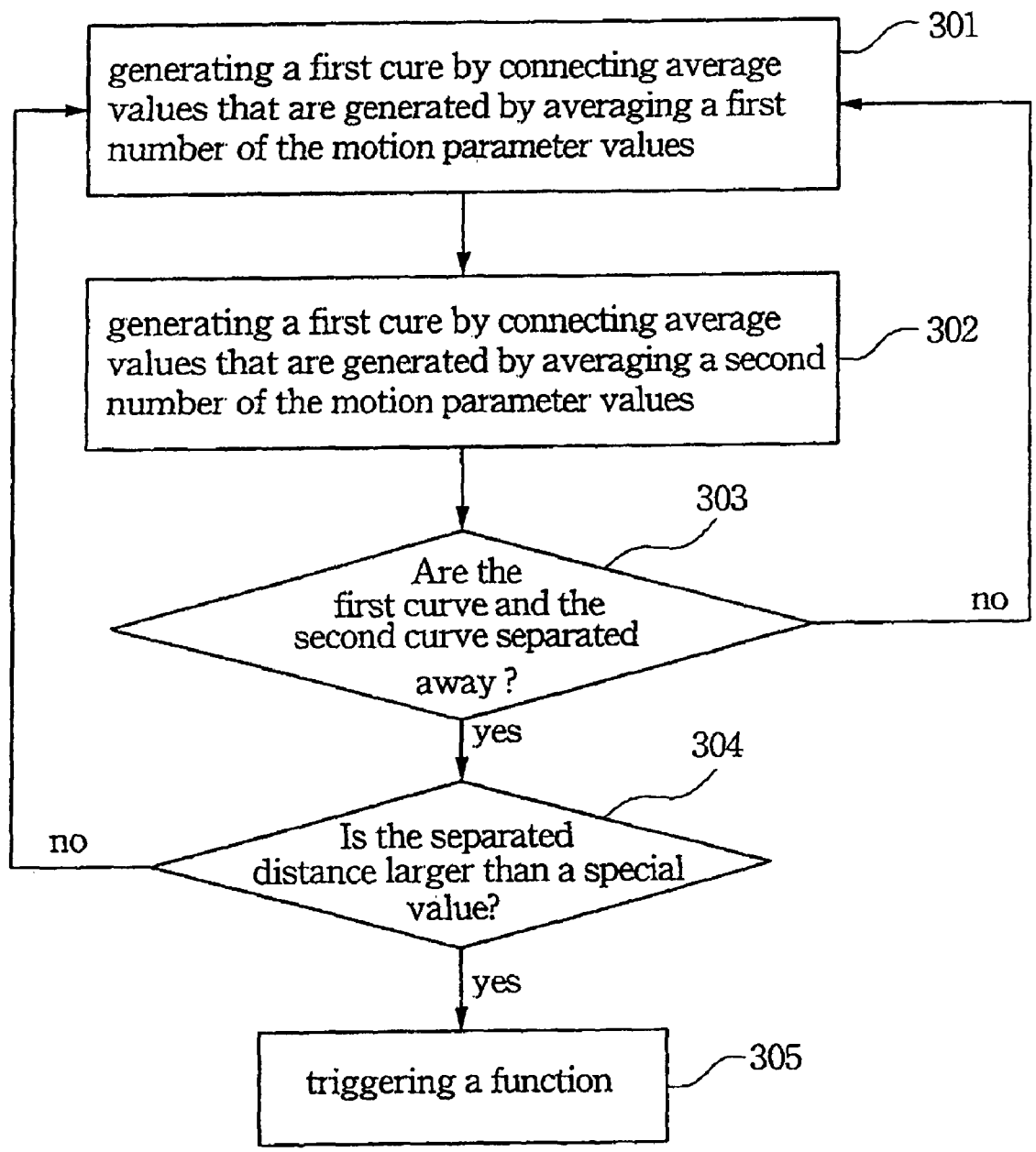
FIG. 3 illustrates a flow chart to determine the motion of the portable electronic device.

FIG. 3 illustrates a flow chart to determine the motion of the portable electronic device. Please refer to FIG. 1 and FIG. 3. In step 301, a first curve is generated by connecting the first average motion parameter value of each detected point. The first average motion parameter value of a detected point, such as a first detected point, is generated by averaging the motion parameter values of a first number of the detected points detected prior to this first detected point. In step 302, a second curve is generated by connecting the second average motion parameter value of each detected point together. The second average motion parameter value of a detected point, such as the first detected point, is generated by averaging the motion parameter values of a second number of the detected points detected prior to this first detected point. In step 303, a determination process is performed to determine whether or not the first curve and the second curve are separated away. When the process determines that the first curve and the second curve are not separated away, step 301 is performed again. When the process determines that the first curve and the second curve are separated away, step 304 is performed. In step 304, when the difference value of the two separated curves is larger than a threshold value, step 305 is performed. In step 305, the controller 204 may trigger the function 206. On the other hand, when the difference value of the separated curves is less than the threshold value, step 301 is performed again.

Accordingly, the motion determination apparatus of the present invention includes a motion sensor to detect a motion of an electronic device and sends out a motion parameter to a processor. The processor determines if the motion parameter represents an intentional movement. A controller triggers a corresponding function based on the result. In this present invention, a determination process is installed in the processor to filter out meaningless motion of the portable electronic device, which may prevent a function being triggered by the meaningless motion. Moreover, the parameter of the determination process may be set by the user to fit his requirement.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A motion determination apparatus installed in an electronic device, the apparatus comprising:
    a motion sensor to detect the motion of the electronic device and generate a plurality of motion parameter values corresponding to detect points respectively;
    a processor for receiving the motion parameter values to generate a first curve and a second curve, wherein the first curve is formed by connecting a plurality of first average values of detected points, and each first average value is generated by averaging the motion parameter values of a first number of detected points detected prior to each detected point, and the second curve is formed by connecting a plurality of second average values of detected points, and each second average value is generated by averaging the motion parameter values of a second number of detected points detected prior to each detected point, and based on a relationship between the first curve and the second curve to trigger a control instruction; and a controller for receiving the instruction to perform a corresponding function.

2. The apparatus of claim 1, wherein when the first curve and the second curve are separated, the control instruction is triggered.

3. The apparatus of claim 1, wherein when the first curve and the second curve are separated and a separated distance between the first curve and the second curve is larger than a threshold value, the control instruction is triggered.

4. The apparatus of claim 1, wherein when the first curve and the second curve are overlapped or intersected, the control instruction is not triggered.

5. The apparatus of claim 1, wherein the first number is 80 and the second number is 210.

6. The apparatus of claim 1, wherein a ratio of the second number to the first number is about 1.2 to 5.

7. The apparatus of claim 1, wherein a ratio of the second number to the first number is about 1.5 to 2.7.

8. The apparatus of claim 1, further comprising a user interface to adjust the first number and the second number.

9. The apparatus of claim 1, wherein the motion sensor is a 2-axle accelerator, a 3-axle accelerator, a compass or an inclinometer.

10. The apparatus of claim 1, wherein the motion parameter value is related to an inclination of the electronic device.

11. The display control apparatus of claim 1, wherein the electronic device is a PDA, a cell phone or a notebook.

12. A method for determining a motion of an electronic device, the method comprising:

(a) detecting the electronic device to send a plurality of motion parameter values of detected points sequentially;

(b) generating a first curve, wherein the first curve is formed by connecting a plurality of first average values of detected points, and each first average value is generated by averaging the motion parameter values of a first number of detected points detected prior to each detected point;

(c) generating a second curve, wherein the second curve is formed by connecting a plurality of second average values of detected points, and each second average value is generated by averaging the motion parameter values of a second number of detected points detected prior to each detected point;

(d) calculating the separation distance between the first curve and the second curve;

(e) comparing the separation distance with a threshold value; and (f) triggering a corresponding function when the separated distance is larger than the threshold value.

13. The method of claim 12, wherein the step (f) further comprises performing step (a) when the first curve and the second curve are overlapped.

14. The method of claim 12, wherein the step (e) further comprises performing step (a) when the separated distance is less than the threshold value.

15. The method of claim 12, wherein the first number is 80 and the second number is 210.

16. The method of claim 12, wherein a ratio of the second number to the first number is about 1.2 to 5.

17. The method of claim 12, wherein a ratio of the second number to the first number is about 1.5 to 2.7.

18. The method of claim 12, further comprising adjusting the first number and the second number.

19. The method of claim 12, wherein the motion parameter values are detected by a 2-axle accelerator, a 3-axle accelerator, a compass or an inclinometer.

20. The method of claim 12, wherein the motion parameter value is related to the inclination of the electronic device.

21. The method of claim 12, wherein the electronic device is a PDA, a cell phone or a notebook.

* * * * *